H. J. HAUSER.
DRILL JIG.
APPLICATION FILED NOV. 27, 1918.
1,329,970.
Patented Feb. 3, 1920.
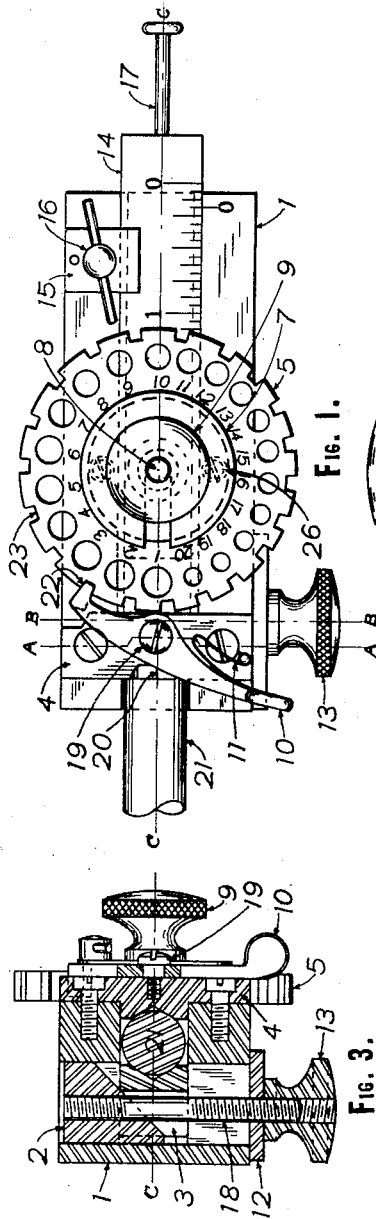
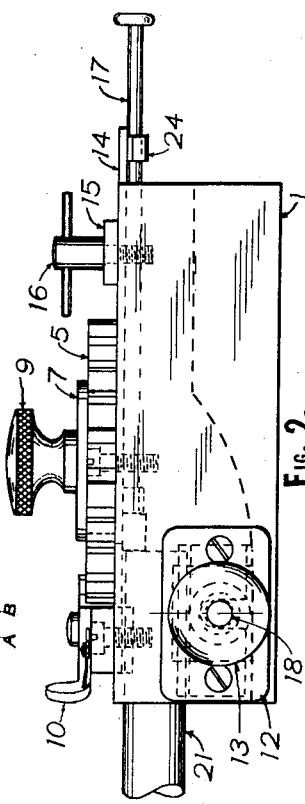
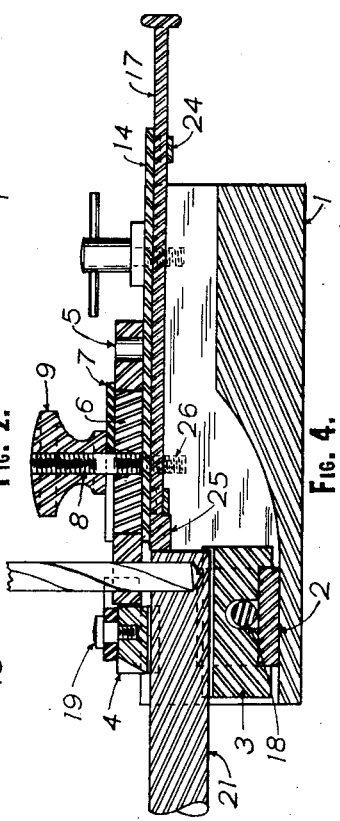
WITNESSES:
Arthur B. Norris
Raymond H. Arnot
INVENTOR.
Henry J. Hauser
BY
ATTORNEY.

UNITED STATES PATENT OFFICE.

HENRY J. HAUSER, OF CHICAGO, ILLINOIS.

DRILL-JIG.

1,329,970.   Specification of Letters Patent.   Patented Feb. 3, 1920.

Application filed November 27, 1918. Serial No. 264,379.

*To all whom it may concern:*

Be it known that I, HENRY J. HAUSER, a citizen of the United States, residing at Chicago, in the county of Cook and State of Illinois, have invented certain new and useful Improvements in Drill-Jigs, of which the following is a specification.

This invention relates to drill jigs used for the purpose of holding stock while it is being drilled. It is particularly adapted for round work, and embodies a clamp by means of which the work is engaged, a gage bar to set the work to scale according to the place or places where the holes are to be drilled, and a guide for the drill, comprising a disk which can be set to register drills of different sizes with the work. The device also includes an ejector pin to dislodge the work from the clamp.

The invention is illustrated in the accompanying drawings in which Figure 1 is a top plan of the jig. Fig. 2 is a side elevation of the same. Fig. 3 is a cross-section on the line A—A through the body and the line B—B through the clamp, of Fig. 1. Fig. 4 is a section on the line C—C of Fig. 1.

Referring specifically to the drawings, 1 indicates a block or body having a groove or channel extending lengthwise through the same, and a rectangular cross slot extending through the same near one end thereof. A fixed jaw 4 is screwed to the block and coöperates with a movable jaw 3 which sets in the groove referred to. These jaws have V-faces to grip round work, and the movable jaw is advanced by means of a wedge which slides in the cross slot, with its inclined face in contact with the inclined under-surface of the jaw 3. The wedge 2 is adjusted by a screw 18 and nut 13, the latter bearing against the side plate 12 fixed to the side of the block. The work is indicated at 21 and as shown in place, it is gripped by the jaws with its inner end projecting under the opening in the top of the block through which the drill D operates.

On the top of the body is a disk 5 which turns on a circular block 6 and is provided with a series of holes of various sizes for guiding the drill. The block or piece 6 bridges the longitudinal groove or channel in the block 1 and is secured thereto by screws indicated at 26. The disk 5 is notched on the edge as indicated at 23, to correspond with the holes, and a latch 10 engages therewith to lock the disk in position and center the selected hole with the stock to be drilled. This disk may be clamped at adjustment by a nut 9 on a screw stud 8 and a slotted washer 7 under the nut. The latch is pivoted on the fixed jaw 4 by stud 19 and is pressed to engagement by a spring 11. 20 is an index mark on the jaw 4, central in relation to the V-clamp, for the purpose of locating any line placed on the stock 21 when it is desired to drill two or more holes in line with each other.

14 is a sliding gage or scale bar which indicates the distance from the end of the stock being drilled to the center of the hole, and this scale is clamped in position by the clamp piece 15 and screw 16. The scale bar extends under the guide disk, and on its under side has clips 24 which carry a rod 17 provided at its inner end with a head 25 against which the end of the stock stops when it is inserted in the jig. After the stock is drilled, the rod 17 may be pushed in to start the stock out after drilling, should a bur cause it to stick.

In use, the index bar 14 is set to proper distance and the stock is inserted between the jaws where it will stop against the head 25. The disk 5 is then adjusted to bring the proper sized hole in the center position, and latched by latch 10, the stock being clamped by operation of the nut 13 and the action of the wedge 2 against the movable jaw 3. The drill may then be advanced through the selected guide hole to drill the hole in the stock, and after the drill is retracted, the stock may, if necessary, be ejected by the push rod 17. The series of graduated guide holes in the disk permits any desired size to be brought to the drilling position without the use of any loose pieces such as pins or plugs that are easily misplaced or lost. The disk may be readily removed by loosening the nut 9 and removing the slotted washer 7 when the disk 5 may be lifted off and another disk substituted fitting the other sizes and guide holes. It will be noticed that the hole in the disk 5 is larger than the nut 9. This is also very convenient in case of the breakage of a drill in the hole. The indexing and locking of the disk is done at its outer edge, at a point farther from the center than the guide holes, thereby insuring greater accuracy in locating the guide hole than is possible where the indexing is done at a point inside the guide holes. The combined scale bar and push rod act as a gage for the distance of the center of the hole from the end of the stock and indicates the distance on the scale. The push rod aids in removing pieces after drilling and is particularly desirable in drilling short lengths of stock which do not project beyond the end of the block. The clamp provides a rigid support for the stock directly beneath the drill, and it may be tightened without the use of any tools such as a wrench or screw driver. Other features of advantage will be apparent to those skilled in the art.

I claim—

1. A drill jig comprising a block having a channel and a cross slot, a member slidable up and down in said channel, having an inclined surface, a wedge block slidable in the slot and engaging said surface to clamp said member against the work, and a drill guide mounted on the block.

2. A drill jig comprising a block provided with a channel therein, a clamp at one end of said channel, a sliding gage bar extending along within said channel, a bridge piece extending across the channel and confining the gage bar therein, and a rotary disk mounted on the bridge piece and extending across the said channel above the gage bar and provided with guide holes for a drill.

3. A drill jig comprising a block provided with a clamp for the work, a drill guide on the block, a scale bar mounted on the block, and adjustable with respect to the guide, and a push rod carried by the scale bar and slidable with respect thereto and adapted to eject the work from the clamp.

In testimony whereof, I affix my signature in presence of two witnesses.

HENRY J. HAUSER.

Witnesses:
CHARLES E. REED,
MORRISON A. SEYMOUR.